US010105880B2

(12) United States Patent
Mathur et al.

(10) Patent No.: US 10,105,880 B2
(45) Date of Patent: Oct. 23, 2018

(54) PROCESS FOR PREPARING THERMALLY CONDUCTIVE ORIENTED UHMWPE PRODUCTS AND PRODUCTS OBTAINED THEREFROM

(71) Applicant: Reliance Industries Limited, Mumbai (IN)

(72) Inventors: Ajit Behari Mathur, Vadodara (IN); Shivaji Vijay Kadam, Jalgaon (IN); Satya Srinivasa Rao Gandham, Vadodara (IN); Uma Sankar Satpathy, Vadodara (IN); Krishna Renganath Sarma, Vadodara (IN); Nanubhai Fuljibhai Patel, Vadodara (IN); Gaurang Manilal Mehta, Vadodara (IN); Yogini Maheshbhai Amin, Vadodara (IN); Amit Kumar Punamchand Shah, Vadodara (IN); Viral Kumar Patel, Kheda (IN); Raksh Vir Jasra, Vadodara (IN); Devesh Kumar Shukla, Vadodara (IN); Ashishkumar Indravadan Parekh, Vadodara (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/121,552

(22) PCT Filed: Feb. 27, 2015

(86) PCT No.: PCT/IB2015/051459
§ 371 (c)(1),
(2) Date: Aug. 25, 2016

(87) PCT Pub. No.: WO2015/128843
PCT Pub. Date: Sep. 3, 2015

(65) Prior Publication Data
US 2016/0368182 A1 Dec. 22, 2016

(30) Foreign Application Priority Data
Feb. 27, 2014 (IN) .......................... 701/MUM/2014
Sep. 29, 2014 (IN) ......................... 3106/MUM/2014

(51) Int. Cl.
B29C 55/18 (2006.01)
C08F 10/02 (2006.01)
B29C 43/00 (2006.01)
B29C 43/24 (2006.01)
B29C 55/00 (2006.01)
C08F 110/02 (2006.01)
B29K 105/16 (2006.01)
B29K 105/00 (2006.01)
B29K 23/00 (2006.01)
(Continued)

(52) U.S. Cl.
CPC ............ *B29C 43/003* (2013.01); *B29C 43/24* (2013.01); *B29C 55/005* (2013.01); *B29C 55/18* (2013.01); *C08F 110/02* (2013.01); *B29C 43/146* (2013.01); *B29K 2023/0683* (2013.01); *B29K 2105/0047* (2013.01); *B29K 2105/162* (2013.01); *B29K 2105/165* (2013.01); *B29K 2105/167* (2013.01); *B29K 2995/0013* (2013.01); *B29L 2007/008* (2013.01); *C08F 10/02* (2013.01); *C08F 2500/01* (2013.01); *C08F 2500/04* (2013.01); *C08F 2500/18* (2013.01); *C08F 2500/26* (2013.01)

(58) Field of Classification Search
None
See application file for complete search history.

(56) References Cited

U.S. PATENT DOCUMENTS

| 4,597,818 A | 7/1986 | Aoyama et al. |
| 9,175,108 B2 | 11/2015 | Sarma et al. |
| 9,260,538 B2 | 2/2016 | Sarma et al. |

(Continued)

FOREIGN PATENT DOCUMENTS

| CN | 101993602 B | 7/2013 |
| EP | 2155937 B1 | 2/2012 |

(Continued)

OTHER PUBLICATIONS

International Search Report issued in PCT/IB2015/051459, dated Jul. 29, 2015 (2 pages).

(Continued)

*Primary Examiner* — Richard A Huhn
(74) *Attorney, Agent, or Firm* — Osha Liang LLP

(57) ABSTRACT

The present disclosure relates to a process for preparing of high thermal conductivity and high heat capacity oriented ultrahigh molecular weight polyethylene (UHMWPE) product. The process includes feeding UHMWPE through rollers to obtain a pre-laminate which is further hot stretched to obtain the oriented UHMWPE product having high thermal conductivity and high heat capacity. The temperature of stretching is maintained below the melt temperature of the UHMWPE throughout the entire process. There is also provided a high thermal conductivity and high heat capacity oriented UHMWPE product prepared by the process of the present disclosure. The oriented UHMWPE product is characterized in the axial thermal conductivity in the range of 70 to 200 W/mK, transverse direction thermal conductivity in the range of 0.022 to 0.045 W/mK and heat capacity in the range of 6 to 25 $MJ/m^3K$.

10 Claims, No Drawings

(51) Int. Cl.
*B29C 43/14* (2006.01)
*B29L 7/00* (2006.01)

(56) References Cited

U.S. PATENT DOCUMENTS

2008/0251960 A1* 10/2008 Harding ................ B29C 43/228
  264/119
2014/0121344 A1* 5/2014 Hlavinka ................ C07F 7/006
  526/211

FOREIGN PATENT DOCUMENTS

| IN | 1440/MUM/2013 | 4/2013 |
| WO | 2012/106567 A2 | 8/2012 |
| WO | 2013/076733 A2 | 5/2013 |
| WO | 2013/118140 A2 | 8/2013 |

OTHER PUBLICATIONS

Written Opinion of the International Searching Authority issued in PCT/IB2015/051459, dated Jul. 29, 2015 (7 pages).

\* cited by examiner

PROCESS FOR PREPARING THERMALLY CONDUCTIVE ORIENTED UHMWPE PRODUCTS AND PRODUCTS OBTAINED THEREFROM

FIELD

The present disclosure relates to high thermal conductivity oriented ultrahigh molecular weight polyethylene products and their preparation.

DEFINITIONS

As used in the present disclosure, the following terms are generally intended to have the meaning as set forth below, except to the extent that the context in which they are used indicate otherwise.

Disentangled: The term 'disentangled' refers to ultrahigh molecular weight polyethylene (UHMWPE)-homopolymer(s) or copolymer(s) of ethylene having molar mass in the range of 2 million to 20 million g/mol; crystallinity greater than 75%; heat of fusion greater than 200 J/g and bulk density ranging from 0.01 to 0.3 g/cc. The polyethylene chains of such a disentangled ultra high molecular weight polyethylene (DUHMWPE) have low entanglement or are completely disentangled.

Oriented products: The term 'oriented products' refer to polymer products in the form of fiber, sheet, film, tape or other forms having oriented polymer chains.

Stretch ratio: The term 'stretch ratio' refers to the ratio of hot stretched film and calendar rolled sheet based on their unit weight and volume.

Pre-laminate: The term 'pre-laminate' refers to the sheet obtained after feeding the UHMWPE through rollers, which is further hot stretched to obtain the oriented UHMWPE products.

BACKGROUND

Polymers exhibit many advantageous properties such as low mass density, chemical stability, high strength-to-mass ratio and the like. Polymeric materials typically have a low thermal conductivity and polymeric substances such as foams prepared from amorphous polymers are widely used for thermal insulation. Materials for heat exchangers and thermal management, however, require high thermal conductivity which is commonly associated with conductors known in the art such as copper, aluminum, titanium and the like.

Recent reports of high thermal conductivity in polyethylene nano fibers and natural biopolymers have renewed the researchers' interest in thermally conductive polymers. It is known that polymers with high crystallinity and chain alignment tend to have higher thermal conductivities. Heat in the polymer is conducted in the direction of the covalently bonded molecular chains and in case of oriented products, the conductivity depends on the crystallinity, orientation, crystal size, length of molecular chains, chemical bridge points, crystal or amorphous boundary, defects, ends and entanglements of the molecular chains and morphologies composed of crystal and amorphous. The randomly oriented crystal region composed of folded ultrahigh molecular weight polyethylene (UHMWPE) chains changes to highly oriented crystal region composed of extended chains. Heat conduction of the extended chains in the direction of the covalent-bonded chain axis in the crystal regions contributes to the high thermal conductivity.

Conventional preparations of UHMWPE fibers for preparing tapes or sheets of UHMWPE involve the steps of preparing gel where large quantities of suitable solvents are used to disentangle the polymer chains so as to achieve highly oriented crystal region composed of extended chains. Furthermore, the processes reported so far are highly energy intensive and cumbersome, thus limiting their use in commercial applications.

The present disclosure therefore envisages a process for preparing highly conductive UHMWPE that mitigates the drawbacks associated with the conventional processes.

OBJECTS

Some of the objects of the present disclosure are discussed herein below:

An object of the present disclosure is to provide a process for preparing oriented UHMWPE products having high axial thermal conductivity and high heat capacity.

Another object of the present disclosure is to provide a process for preparing oriented UHMWPE products having high axial thermal conductivity and high heat capacity, which is simple, commercially viable and environment friendly.

Yet another object of the present disclosure is to provide oriented UHMWPE products having high axial thermal conductivity and high heat capacity.

Still another object of the present disclosure is to ameliorate one or more problems of the prior art or to at least provide a useful alternative.

Other objects and advantages of the present disclosure will be more apparent from the following description.

SUMMARY

The present disclosure in one aspect relates to a process for preparing high axial thermal conductivity and high heat capacity oriented ultrahigh molecular weight polyethylene (UHMWPE) products. The process includes feeding UHMWPE at the nip of at least one set of first rollers having a first pre-determined roller speed and a first pre-determined temperature to obtain a pre-laminate. The pre-laminate so obtained is hot stretched using at least one set of second rollers at a second pre-determined roller speed and a second pre-determined temperature to obtain oriented UHMWPE products having high thermal conductivity and heat capacity. The UHMWPE used in the disclosure can be substantially disentangled. The temperature for preparing the pre-laminate and hot stretching can be less than the melt temperature of the UHMWPE and in the range of 125° C. to 155° C.

In another aspect there is provided a high axial thermal conductivity and high heat capacity oriented UHMWPE product prepared by the process of the present disclosure. The axial thermal conductivity of the UHMWPE product in the range of 70 to 200 W/mK and heat capacity of the UHMWPE product is in the range of 6 to 25 MJ/m³K.

DETAILED DESCRIPTION

Organic polymers are known to be thermally insulating materials where the thermal conductivity is usually found to be <1 W/mK at room temperature. However, the axial thermal conductivity of oriented polyethylene polymer, measured parallel with the alignment of polymer chains increases with the orientation. The degree of crystallinity and connectivity between crystallites further adds to the thermal conductivity of polyethylene. Conventionally prepared polyethylene oriented products by gel spun fiber using UHMWPE exhibits high thermal conductivity, which is about 30-100 times more than the polymer resin. However, the process of making highly thermally conductive UHMWPE products by gel extrusion requires large amount of solvent.

The present disclosure envisages a process for preparing polyethylene oriented products using a solvent free process and high thermal conductivity oriented UHMWPE products.

Conventionally, it has been generally reported that thermal conductivity is directly related to tensile modulus. However, the inventors of the present disclosure have surprisingly found that thermal conductivity is dependent more on the stretch ratio rather than the tensile modulus. The inventors of the present disclosure also obtained a surprising effect that by using UHMWPE of molecular weight distribution (MWD) of at least 8, preferably of at least 10 MWD, and hot stretching it at a temperature in the range of 125° C. to 155° C. results in high thermal conductivity oriented products. UHMWPE having a MWD of at least 8 is capable of being hot stretched more.

In accordance with one aspect of the present disclosure, there is provided a process for preparing high thermal conductivity and high heat capacity oriented UHMWPE products. The process includes but is not limited to the steps presented herein below.

In the first step of the present disclosure, UHMWPE powder or a compression molded UHMWPE preform is fed at the nip of at least one set of first rollers having a first pre-determined roller speed and a first pre-determined temperature to obtain a pre-laminate. The density of the pre-laminate is maintained in the range of 0.9650 g/cc to 0.9770 g/cc, measured at a temperature of 22.5° C.

In one embodiment, the thickness of the compression molded UHMWPE preform ranges from 1 to 3 mm. The first rollers in accordance with the present disclosure can be one set of rollers or more than one set of rollers. The set of rollers comprises at least a pair of rollers. When more than one set of rollers are used, the rollers can be arranged serially or in parallel.

The roller temperature is kept below or close to the melt temperature of the polymer in the range of 125° C. to 155° C. In an exemplary embodiment of the present disclosure, the temperature is maintained at 125° C.

In another embodiment of the present disclosure, the first pre-determined roller speed ranges from 20 to 200 cm/min when a roller of 150 mm diameter is used and the roller speed ratio is in the range of 0.80 to 3.0. The roller speed ratio is the ratio of roller speed in a roller pair.

The width of the pre-laminate is adjusted by setting the required gap parallel to the rollers. In one embodiment, the width and thickness of the pre-laminate is maintained at 50 to 55 mm and 0.05 to 0.20 mm, respectively. The width of the pre-laminate is further adjusted by modifying the gap between the spacers and as per the requirement the pre-laminate is slit to obtain tapes/strips of required width.

In the next step, the pre-laminate thus obtained is then hot stretched using at least one set of second rollers at a second pre-determined temperature and at a second pre-determined roller speed to obtain the oriented UHMWPE products. Stretching at a specific temperature and speed causes the polymer chains to align in the direction of stretching; thereby inducing anisotropy in the resultant product and making it highly thermally conductive. In one embodiment, the roller temperature is in the range of 125° C. to 155° C. Care is taken that the UHMWPE temperature does not go beyond the melt temperature. The roller speed is increased when the temperature is above the melt temperature of the UHMWPE (about 140° C.). The increase in speed of the rollers decreases the contact time of the UHMWPE with the rollers so as to not allow the UHMWPE to be exposed to the higher temperature. The speed of stretching is maintained in the range from 10 to 80 mm/min. Laminates having thin cross sections are obtained with different stretch ratios.

The stretch ratio of the hot stretched product to the pre-laminate is in the range of 30 to 250, preferably in the range of 30 to 130.

In one embodiment, the stretching of the pre-laminate is achieved in a hot stretching chamber. The temperature of the chamber can be adjusted in a way that it is below the melt temperature of the pre-laminate or the pre-laminate/partly stretched pre-laminate, i.e., from 125° C. to 155° C. The stretching can be achieved in more than one step and the residence time of the pre-laminate in the chamber can be maintained from 30 seconds to 5 minutes. The hot stretching can be done in the heating chamber wherein the pre-laminate can be heated using contact or non-contact heating. The heating medium can be at least one of air, inert gas and liquid.

The UHMWPE used in the present process has certain pre-determined properties. The UHMWPE is substantially disentangled and has molecular weight ranging from 2 to 20 million g/mole, being prepared by using suitable catalyst(s) as described in the documents U.S. Pat. No. 9,175,108, U.S. Pat. No. 9,260,538 and 1440/MUM/2013. The powder is also characterized for various parameters such as Reduced Specific Viscosity (RSV), measured by means of ASTM-D 4020-1a; molecular weight measured by the Mark-Houwink method using the equation: $M=K[\eta]\alpha$, where K and a are constants, $K=53700$, $\alpha=1.37$ and $\eta$— intrinsic viscosity; bulk density (BD) measured by ASTM D-1895; molecular weight distribution by melt rheometry using RDA-III from T. A. Instruments employing Orchestrator software; density by ASTM D 792 using measuring unit of Mettler Toledo; melting temperatures (Tm) and heat of fusion during melting ($\Delta$HTm) by differential scanning calorimeter. The molecular weight distribution of the polymer powder is tailored by manipulating the process conditions including but not limiting to temperature and pressure along with other properties like the RSV>17 dl/g, $\Delta$H>200 J/g and the bulk density <0.3 g/cc. The UHMWPE powder formed as a result of the afore-stated process is highly crystalline and richly disentangled.

The process of the present disclosure further includes the step of incorporation of additives. The additives used in accordance with the present disclosure include but is not limited to carbon nanotubes, graphene, carbon black, aluminum powder and boron nitride. The additives can be in the form of powders or fine particles. The additives can be added to the polymer by blending or dispersing before the polymer is fed to the rollers. The additives can further enhance the thermal conductivity of the resultant products and extend the limit of thermal conductivity as achieved by pure UHMWPE.

In accordance with another aspect of the present disclosure, there is provided a high thermal conductivity and high heat capacity oriented UHMWPE product prepared by the afore-stated process. In one embodiment, the product thus prepared is characterized by axial thermal conductivity in the range of 70 to 200 W/mK, transverse direction thermal conductivity in the range of 0.022 to 0.045 W/mK and heat capacity in the range of 6 to 25 MJ/m$^3$K. The axial thermal conductivity of the product is dependent on the stretch ratio of the sheet. The products prepared in accordance with the process of the present disclosure have high thermal conductivity as well as high heat capacity. This differentiates the present process from the conventional processes. Furthermore, the product prepared according to the present process has see-through clarity.

The present disclosure provides a simple, eco-friendly solvent free process where a highly crystalline disentangled UHMWPE polymer is processed to obtain products having highest degree of thermal conductivity. The resultant products, therefore, find plenty of applications in thermal management systems such as heat exchanger/sinks in printed circuit boards and electronic devices, computers, printers, automotive interior and exteriors, appliances, batteries, superconducting coils, refrigeration systems, building constructions, interior temperature controls of housings, chemical engineering devices, thermal solar devices and the like. The products of the present disclosure include but are not limited to tape, strip, fiber and film. The thermally conductive articles from UHMWPE film/tape/stripe/fiber can be in the form of composites of single or multiple layers (with or without additive) and based on the alignment of film/tape/strip/fiber, the path of conduction can be defined.

The present disclosure will now be explained in the light of the following non-limiting example which is set forth for illustration purpose only and not to be construed for limiting the scope of the disclosure.

EXAMPLE 1

Three UHMWPE samples of the following properties (Table 1) were used to prepare thin films by maintaining different stretch ratios. While the RSV and molecular weight (MW) of the samples 1 and 2 were in a close range, the molecular weight distribution of Sample 2 was higher than Sample 1. The RSV, MW and the MWD of sample 3 were higher than samples 1 and 2.

TABLE 1

| | UHMWPE Properties | | | |
|---|---|---|---|---|
| Polymer sample | RSV (dl/g) | MW (million), g/mol | MWD | BD (g/cc) |
| 1 | 27.33 | 5 | 12.3 | 0.063 |
| 2 | 28 | 5.16 | 19.8 | 0.074 |
| 3 | 52.7 | 12.3 | >25 | 0.06 |

The conditions of the stretched film sample preparation and their tensile and thermal properties are presented in Table 2. The highest stretch ratio is the limit beyond which the thin film reaches the break point.

The axial thermal conductivity of the stretched film so prepared was found to increase with the increase in tensile modulus which in turn is related to the stretch ratio as seen in sample 1 (Table 2). It is found that the polymer sample 2 could be stretched to 128.6 times with thermal conductivity of 128.2 W/mK whereas the tensile modulus is lower than stretched film of lower stretch ratio of polymer sample 1. This may be possibly due to superior alignment of the polymer chains in sample 2 with high stretchability as the molecular weight distribution (MWD) of sample 2 is broader than polymer sample 1. Similarly, the polymer sample 3 having a broad MWD could be stretched to 100 times with a thermal conductivity of 77 W/mK. The tensile modulus is lower for sample 3, similar to that observed in case of sample 2. Higher axial thermal conductivity, therefore, can be attained with the increase of stretch ratio instead of increase on tensile modulus with broader MWD.

The axial thermal conductivity of the film prepared from polymer sample 2 was found as high as 130.1 W/mK at 49.4° C. which is highest reported value in the literature (Table 5). The thermal conductivity of the polymer film was not found to depend on the temperature range studied i.e. −21.5° C. to about 50° C. (Tables 3 to 5).

The thermal conductivity of the polymer film in the transverse direction was found in the range of 0.022 to 0.045 W/mK.

The heat capacity (Cp) also increased with the stretch ratio of the film from about 7.0 MJ/m$^3$K to as high as 24 MJ/m$^3$K (in the temperature range of about −20° C. to about 50° C.) with the increase in stretch ratio 31 and 85 of sample 1 and about 128 of sample 2 (Tables 3 to 5). This made the solid state thermal properties of the stretched polymer film unique, having a combination of very high thermal conductivity as well as Cp.

The processing speed of the sheet can be controlled by suitably adjusting the speed and temperature of the two roll mill. Further, the rate of stretching of the sheet was found to depend on the set temperature of the stretching unit.

It was also determined that the composite form of the uniaxial thermally conductive film/strip/tape/fiber of UHMWPE can have multi-axial controlled thermal conductivity depending on the direction of placing their unit forms in the composite layers and achieving the product by applying compressive force to compact them.

TABLE 2

| Polymer Sample No. | Sample Name | Pre-laminate making Machine | Pre-laminate making Temp ° C. | Hot stretching of pre-laminate, ° C. Step 1 Temperature | Step 1 Cross head speed (mm/min) | Step 2 Temperature | Step 2 Cross head speed (mm/min) | Step 3 Temperature | Step 3 Cross head speed (mm/min) | Stretch ratio* | Tensile modulus of hot stretched pre-laminate, GPa | Axial Thermal Conductivity (W/mK) @ temp (° C.) |
|---|---|---|---|---|---|---|---|---|---|---|---|---|
| 1 | 5PE31 | Two roll mill | 125° C. | 130° C. | 50 | 145° C. | 60 | 150° C. | 60 | 31.29 | 75.35 | 55.0 @ 25.0 |
|  | 5PE53 |  | 125° C. | 130° C. | 50 | 145° C. | 60 | 150° C. | 60 | 53.8 | 94 | 58.6 @ 30.0 |
|  | 5PE77 |  | 125° C. | 130° C. | 50 | 145° C. | 60 | 152° C. | 60 | 77.11 | 121.4 | 71.6 @ 30.0 |
|  | 5PE85 |  | 125° C. | 130° C. | 50 | 145° C. | 60 | 150° C. | 60 | 85.5 | 124.4 | 115.8 @ 25.4 |
| 2 | 5PE128 |  | 125° C. | 130° C. | 50 | 145° C. | 60 | 152° C. | 60 | 128.6 | 92.18 | 128.2 @ 25.6 |
| 3 | PPE100 |  | 125° C. | 130° C. | 50 | 145° C. | 60 | 152° C. | 60 | 100 | 91.0 | 77 @ 24.0 |

Stretch ratio is ratio of hot stretched film and calendar rolled sheet based on their unit weight and volume.

TABLE 3

Sample 5 PE 31

| Temperature (° C.) | Thermal conductivity (W/mK) | Cp (MJ/m³K) |
|---|---|---|
| 22.7 | 57.4 | 7.20 |
| 11.5 | 56.1 | 7.08 |
| 2.0 | 55.6 | 7.16 |
| −11.9 | 56.9 | 6.55 |
| −21.1 | 57.3 | 6.25 |
| 25 | 55.0 | 7.64 |
| 48.7 | 56.5 | 7.89 |

TABLE 4

Sample 5 PE 85

| Temperature (° C.) | Thermal conductivity (W/mK) | Cp (MJ/m³K) |
|---|---|---|
| 24.2 | 112.3 | 15.38 |
| 11.5 | 112.9 | 15.06 |
| 1.7 | 113.4 | 14.76 |
| −12.2 | 114.5 | 13.39 |
| −21.3 | 113.4 | 13.40 |
| 25.4 | 115.8 | 15.33 |
| 48.7 | 117.3 | 17.69 |

TABLE 5

Sample 5 PE 128

| Temperature (° C.) | Thermal conductivity (W/mK) | Cp (MJ/m³K) |
|---|---|---|
| 23.5 | 123.5 | 21.22 |
| 11.4 | 123.5 | 19.75 |
| 1.9 | 130.5 | 19.03 |
| −12.1 | 124.3 | 18.82 |
| −21.4 | 124.6 | 18.27 |
| 25.6 | 128.2 | 20.85 |
| 49.4 | 130.1 | 24.19 |

TECHNICAL ADVANTAGES AND ECONOMIC SIGNIFICANCE

The process of the present disclosure is simple, free from solvent and requires easily available commercial processing tools.

The UHMWPE products of the present disclosure demonstrate uniaxial as well as multi-axial thermal conductivity.

The high uniaxial thermal conductivity of the UHMWPE film/tape/stripe/fiber provides flexibility of designing for applications such as heat exchanger/sinks in printed circuit boards and electronic devices, computers, printers, automotive interior and exteriors, appliances, batteries, superconducting coils, refrigeration systems, building constructions, interior temperature controls of housings, chemical engineering devices, thermal solar devices and the like.

As the products have a unique combination of high axial thermal conductivity and high electrical insulation, they can find use in developing efficient electrical products which include cables, electrical junctions and the like.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A process for preparing a high axial thermal conductivity and high heat capacity oriented ultrahigh molecular weight polyethylene (UHMWPE) product; said process comprising the following steps:
   a. feeding UHMWPE at the nip of at least one set of first rollers having a first pre-determined roller speed and a first pre-determined temperature to obtain a pre-laminate; and
   b. hot stretching said pre-laminate using at least one set of second rollers at a second pre-determined roller speed and a second pre-determined temperature to obtain the oriented UHMWPE product having high thermal conductivity and high heat capacity;
   wherein said hot stretching of the pre-laminate is in the range of 10 to 80 mm/minute;
   wherein the axial thermal conductivity of the UHMWPE product is in the range of 70 to 200 W/mK;
   wherein the heat capacity of the UHMWPE product is in the range of 6 to 25 MJ/m³K;
   wherein the stretch ratio of the length of the hot stretched product and the pre-laminate is in the range of 30 to 250; and
   wherein the molecular weight distribution of said UHMWPE is at least 12.3.

2. The process as claimed in claim 1, wherein the UHMWPE is disentangled.

3. The process as claimed in claim 1, wherein the UHMWPE is in the form of one of UHMWPE powder and compressed UHMWPE preform.

4. The process as claimed in claim 1, wherein said first pre-determined roller speed and second pre-determined roller speed are independently in the range of 2 to 200 cm/min.

5. The process as claimed in claim 1, wherein said first pre-determined temperature and said second predetermined temperature is less than the melt temperature of UHMWPE and independently in the range of 125° C. to 155° C.

6. The process as claimed in claim 1, further includes incorporating at least one additive in the UHMWPE fed at the nip of at least one pair of rollers.

7. The process as claimed in claim 6, wherein said additive is at least one selected from the group consisting of carbon nanotubes, graphene, carbon black, aluminum powder and boron nitride.

8. The process as claimed in claim 1, wherein the stretch ratio of the length of the hot stretched product and the pre-laminate is in the range of 30 to 130.

9. A high conductivity and high heat capacity oriented UHMWPE product prepared by the process as claimed in claim 1, characterized by the following properties:
   a. axial thermal conductivity in the range of 70 to 200 W/m;
   b. transverse direction thermal conductivity in the range of 0.022 to 0.045 W/mK;
   c. heat capacity in the range of 6 to 25 MJ/m$^3$K; and
   d. crystallinity in the range of 85 to 95%.

10. The high conductivity and high heat capacity oriented UHMWPE product as claimed in claim 9, wherein said product is obtained in a form selected from the group consisting of sheets, tapes, fibers and films.

* * * * *